United States Patent
Kapadia et al.

(10) Patent No.: US 8,509,210 B2
(45) Date of Patent: Aug. 13, 2013

(54) DIFFERENTIATING WIRELESS UPLINK BANDWIDTH REQUEST BY CONNECTION PRIORITY

(75) Inventors: Prateek Kapadia, Mumbai (IN); Sesha Pavana Srinadh B. V., Kavali (IN); Abhay Karandikar, Mumbai (IN); Harshad Maral, Mumbai (IN)

(73) Assignee: TTSL IITB Center For Excellence in Telecom (TICET), Mumbai (IN)

( * ) Notice: Subject to any disclaimer, the term of this patent is extended or adjusted under 35 U.S.C. 154(b) by 469 days.

(21) Appl. No.: 12/845,978

(22) Filed: Jul. 29, 2010

(65) Prior Publication Data

US 2011/0058493 A1   Mar. 10, 2011

(30) Foreign Application Priority Data

Sep. 7, 2009 (IN) .............. 2058MUM2009

(51) Int. Cl.
*H04W 74/08* (2009.01)
(52) U.S. Cl.
USPC ............................................. 370/347
(58) Field of Classification Search
USPC .............................................. 370/347
See application file for complete search history.

(56) References Cited

U.S. PATENT DOCUMENTS

| | | | | |
|---|---|---|---|---|
| 7,729,696 | B2* | 6/2010 | Harris et al. | 455/432.3 |
| 2007/0047570 | A1* | 3/2007 | Benveniste | 370/448 |
| 2007/0201377 | A1* | 8/2007 | Santhanam | 370/252 |
| 2009/0257421 | A1* | 10/2009 | Nakashima et al. | 370/345 |

OTHER PUBLICATIONS

Wang et al., 'An Efficient Traffic Adaptive Backoff Protocol for Wireless MAC Layer', International Conference on Wireless Algorithms, Systems and Applications, 2007 IEEE, pp. 169-173.*

* cited by examiner

*Primary Examiner* — Melvin Marcelo
(74) *Attorney, Agent, or Firm* — Rahman LLC

(57) ABSTRACT

Differentiating wireless uplink bandwidth request by connection priority. Embodiments herein relate to wireless communications, and more particularly to bandwidth management in wireless communications. Embodiments herein focus on multiplexing bandwidth requests on a common random access channel; specifically on contention resolution protocols for a common random access channel. Embodiments herein propose a differentiated back-off timer scheme to address the problems of QoS insensitivity and delay inequity, a set of back-off parameters to implement this scheme and a method of implementing existing well-known back-off strategies within this scheme's framework.

11 Claims, 4 Drawing Sheets

DIFFERENTIATING WIRELESS UPLINK BANDWIDTH REQUEST BY CONNECTION PRIORITY

FIELD OF INVENTION

This invention relates to wireless communications, and more particularly to bandwidth management in wireless communications.

BACKGROUND OF INVENTION

In wireless cellular communication system, each mobile station is associated with a base station, and one base station is associated with multiple mobile stations. The mobile station sends and receives all data through the associated base station using uplink and downlink channels, respectively. The base station, in turn, is connected to other wired or wireless entities that route and forward packets between mobile stations and other network end-points. The physical and information structure of uplink and downlink channels and processes for managing them, are defined in a mobile communications protocol.

Multiple mobile stations may potentially require their packets to be sent at the same time. Thus, the protocol design must allow for multiplexing these packets. In 4G candidate protocols like LTE-A and 802.16m, bandwidth request multiplexing is achieved by assigning each mobile station a dedicated uplink request channel. A dedicated request channel effectively allows two mobile stations to request bandwidth at the same time. In this method, however, even mobile station that do not have any data to send also occupy request channels; leading to low average channel utilization, and hence wastage of communication resources. The bandwidth request multiplexing may also be achieved by resolving contention for bandwidth request on a common random access channel. A common random access channel is an effective utilization of resources; however, two mobile stations that request bandwidth together cannot get their bandwidth requests decoded by the base station due to collision.

Some techniques from 802.11 contention resolution, though, are universally applicable—like binary exponential back off (BEB). In 802.11, contentions between two mobile stations are resolved by a "back-off" and retry mechanism. Mobile stations detect contention and each contending mobile station chooses a time interval to wait before resending the data frame. The time interval that each mobile station waits before retrying is called a "back-off timer"; and its value is chosen uniformly at random from a "contention window". A mobile station may retry multiple times in contention for sending the same data frame. The contention window increases for each retry 'k' by the recurrence $CW_k = 2 * CW_{k-1}$ (k>1), $CW_1 = CW_{min}$.

The issue of differentiated resource allocation in wireless networks based on the delay sensitivities of different types of traffic has been addressed in the past. The Medium Access Control (MAC) layer of the IEEE 802.11 standard uses the Distribution Coordination Function (DCF), which employs the Carrier Sense Multiple Access with Collision Avoidance (CSMA/CA) algorithm and optional 802.11 Request-To-Send/Clear-To-Send (RTS/CTS) control frames, to share the medium between multiple stations. This technique does not differentiate between different types of traffic and as a result, a delay sensitive type, Voice over Wireless LAN (VoWLAN) for example, might experience an intolerably long delay as compared to another type that is not so delay-sensitive, e-mail for example, that might get quicker service. The IEEE 802.11e-2005 amendment to the 802.11 standard addresses this limitation by proposing modifications to the MAC layer. It describes an Enhanced Distributed Channel Access (EDCA) scheme which defines Traffic Categories (TC). For example, e-mail could be assigned to a low priority class and VoWLAN could be assigned to a high priority class. With EDCA, high priority traffic has a higher chance of being sent than low priority traffic: a station with high priority traffic waits a little less before it sends its packet, on average, than a station with low priority traffic.

It has already been proposed that a typical bandwidth request channel is shared by all mobile station users. Simultaneous bandwidth requests by multiple users collide, and cannot be decoded by the base station. A mobile station that does not receive a response from the base station until a certain timeout period must assume that its request collided, and hence must retry sending the request. Each retry attempt is made after waiting for a random backoff timer to reduce the probability of repeated collisions between users. This may occur a few times until the mobile station either gets a response or gives up trying. In most communication systems, the back-off timer is a random number typically drawn uniformly from the interval (0, max), where max is exponential in the number of failed attempts. However, the scheme as described above suffers from QoS insensitivity. Here, users with different QoS requirements have equal chance of winning contention for their bandwidth requests. The above scheme also suffers from delay inequity. Users that have attempted more times have a larger expected back-off timer than users that have attempted fewer times. Thus, the expected delay in getting service increases with the number of failed request attempts.

SUMMARY OF INVENTION

Embodiments herein disclose a method of a mobile station for sending a bandwidth request to a base station, the method comprising of the mobile station selecting a random number as a time delay based on a plurality of parameters on not detecting a response from the base station within a time period to a bandwidth request sent by the mobile station; and the mobile station sending the bandwidth request to the base station after the time delay. The method further comprises steps of the base station estimating the plurality of parameters based on Quality of Service (QoS) for the mobile station and load on the base station; the base station sending the plurality of parameters to the mobile station; and the mobile station storing the plurality of parameters on receiving the plurality of parameters from the base station. The parameters comprise of connection priority, initial back-off interval, maximum back-off interval, and back-off interval scaling factor. The random number is selected from an interval defined by (initial back-off interval, min[(back-off interval scaling factor^(k−1))*initial back-off interval, maximum back-off interval]), where k is the number of the current retry by the base station to send the bandwidth request. The parameters comprise of connection priority, a minimum time delay interval ($CW_{min,0}$), a maximum time delay interval ($CW_{max,0}$), a minimum scaling factor and a maximum scaling factor. The random number is selected from an interval defined by ($CW_{min, k}$, $CW_{max, k}$), $CW_{min, k} = CW_{min, k-1} * SF_{min}$, $CW_{max, k} = CW_{max, k-1} * SF_{max}$, where k is the number of the current retry by the base station to send the bandwidth request and $CW_{min, k-1}$ is minimum time delay interval for $(k-1)^{th}$ attempt, $CW_{max, k-1}$ is maximum time delay interval for $(k-1)^{th}$ attempt, $SF_{min}$ is the minimum scaling factor and $SF_{max}$ is the maximum scaling factor.

Also, disclosed herein is a base station comprising of at least one means adapted for estimating the plurality of parameters based on Quality of Service (QoS) for a mobile station currently being served by the base station and load on the base station; and sending the estimated parameters to the mobile station. The base station is adapted for estimating the parameters, wherein the parameters comprise of connection priority, initial back-off interval, maximum back-off interval, and back-off interval scaling factor. The base station is adapted for estimating the parameters, wherein the parameters comprise of connection priority, a minimum time delay interval, a maximum time delay interval, a minimum scaling factor and a maximum scaling factor. The base station is adapted for checking when the parameters are to be sent to the mobile station.

Disclosed herein is a mobile station comprising at least one means adapted for storing a plurality of parameters, on receiving the plurality of parameters from a base station; selecting a random number as a time delay based on the parameters on not detecting a response from the base station within a time period to a bandwidth request sent by the mobile station; and sending the bandwidth request to the base station after the time delay. The mobile station is adapted for storing parameters, the parameters comprising of connection priority, initial back-off interval, maximum back-off interval, and back-off interval scaling factor. The mobile station is adapted for selecting the random number from an interval defined by (initial back-off interval, min[(back-off interval scaling factor^(k−1))*initial back-off interval, maximum back-off interval]), where k is the number of the current retry by the base station to send the bandwidth request. The mobile station is adapted for storing parameters, the parameters comprising of connection priority, a minimum time delay interval ($CW_{min, 0}$), a maximum time delay interval ($CW_{max,0}$), a minimum scaling factor and a maximum scaling factor. The mobile station is adapted for selecting the random number from an interval defined by ($CW_{min, k}$, $CW_{max, k}$), $CW_{min, k} = CW_{min, k-1}*SF_{min}$, $CW_{max, k} = CW_{max, k-1}*SF_{max}$, where k is the number of the current retry by the base station to send the bandwidth request and $CW_{min, k-1}$ is minimum time delay interval for $(k-1)^{th}$ attempt, $CW_{max, k-1}$ is maximum time delay interval for $(k-1)^{th}$ attempt, $SF_{min}$ is the minimum scaling factor and $SF_{max}$ is the maximum scaling factor.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawing, through out which like reference letters indicate corresponding parts in the figure. The embodiments herein will be better understood from the following description with reference to the drawing, in which.

DETAILED DESCRIPTION OF INVENTION

Figure 1:
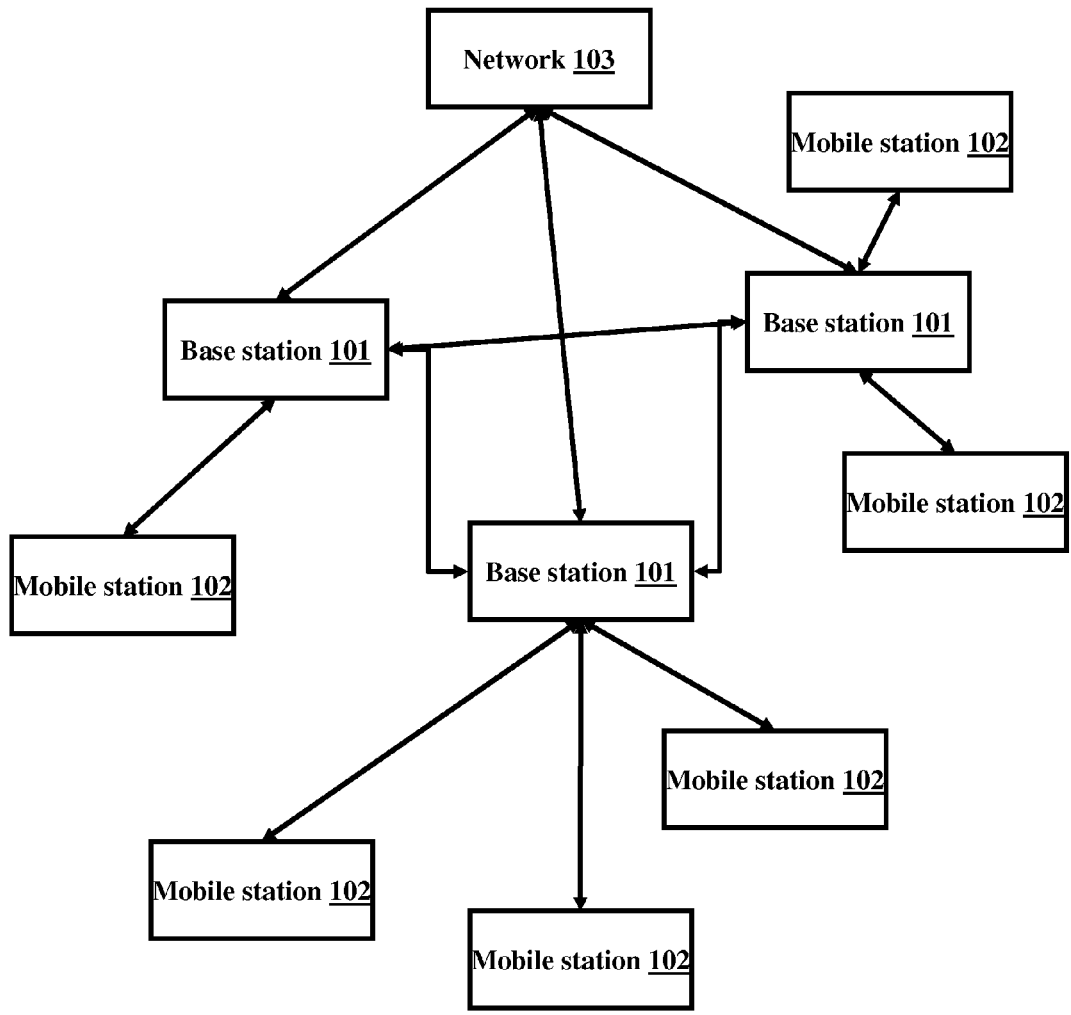
FIG. 1 depicts a system, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve contention resolution protocols for a common random access channel. Referring now to the drawings, and more particularly to FIGS. 1-5, where similar reference characters denote corresponding features consistently throughout the figures, there are shown preferred embodiments.

Embodiments herein focus on multiplexing bandwidth requests on a common random access channel; specifically on contention resolution protocols for a common random access channel.

Embodiments herein have been described with respect to FIG. 1 which depicts a network 103, a plurality of base stations 101 and a plurality of mobiles stations 102. Each of said plurality of base stations 101 are linked to a plurality of mobile stations 102, whereas each of said plurality of mobile stations 102 are linked to only one base station 102. Applications may be running on the mobile station 102, depending on the preferences of the user of the mobile station 102. The base stations 101 receives bandwidth requests from the mobile stations 102, which may be sent from applications present on the mobile stations 101. The base stations 101 define a set of parameters, which are used by the mobile stations 101 to make the bandwidth requests. The parameters comprise of connection priority, initial back-off interval (I), maximum back-off interval (M), and back-off interval scaling factor (s). The base station 101 may send these parameters to a mobile station 102 either on a common downlink broadcast channel or on a separate channel setup for the QoS negotiation.

In another embodiment herein, the base station 101 may send parameters comprising of the connection priority, a minimum time delay interval, a maximum time delay interval, minimum scaling factor and a maximum scaling factor to the mobile station 101.

The mobile station attempts to request bandwidth at time intervals, where the time intervals are drawn randomly depending on the values of initial back-off interval (I), maximum back-off interval (M) and back-off interval scaling factor(s).

Figure 2:
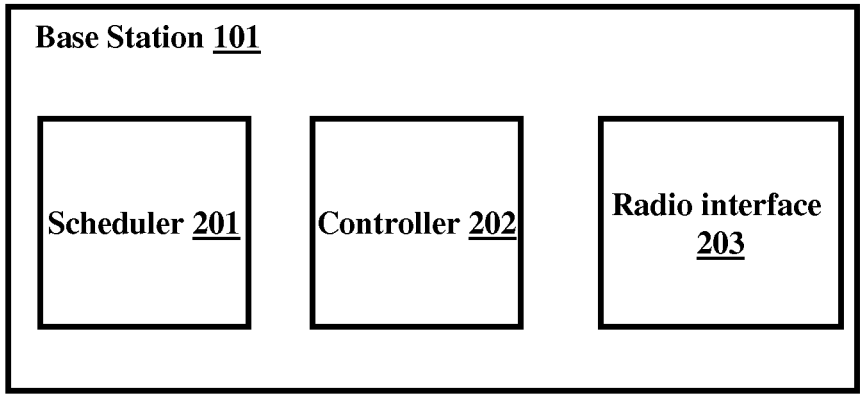
FIG. 2 depicts a base station, according to embodiments disclosed herein.

FIG. 2 depicts a base station, according to embodiments disclosed herein. The base station 101 comprises of a scheduler 201, a controller 202 and a radio interface 203. The radio interface 203 comprises of suitable means for the base station 101 to communicate with mobile stations 102 and other network components. The controller 202 controls the functioning of the modules present within the base station 101, including the scheduler 201 and the radio interface 203.

The scheduler 201 defines a set of parameters, which are used by the mobile stations 101 to make the bandwidth requests. The parameters comprise of connection priority, initial back-off interval (I), maximum back-off interval (M), and back-off interval scaling factor (s). The scheduler 201 may send these parameters to a mobile station 102 either on a common downlink broadcast channel or on a separate channel setup for the QoS negotiation using the radio interface 203.

Connection priority is a unique identifier for the triplet of initial back-off interval, maximum back-off interval and back-off interval scaling factor. The connection priority depends on the Quality of Service (QoS) defined for a mobile station. Differentiation between QoS classes is achieved by associating different connection priorities with each QoS class, and different values for the corresponding triplets. For example, to differentiate between a low-delay tolerant class associated with connection priority c1 and a high-delay tolerant class c2, the triplets would have values c1=(I1, M1, s1) and c2=(I2, M2, s2), such that I1<=I2, M1<=M2, s1<=s2. The scheduler 201 can also control expected delay to response by changing the parameters. In the previous example, the expected delay for parameters for c1 is less than that for c2.

In another embodiment herein, the scheduler 201 may send parameters comprising of the connection priority, a minimum time delay interval, a maximum time delay interval, a minimum scaling factor and a maximum scaling factor to the mobile station 101. The connection priority has a set of parameters comprising of the minimum time delay interval, the maximum time delay interval, the minimum scaling factor and the maximum scaling factor associated with it. The connection priority depends on the Quality of Service (QoS) defined for a mobile station. Differentiation between QoS classes is achieved by associating different connection priorities with each QoS class, and different values for the corresponding set of parameters.

Figure 3:
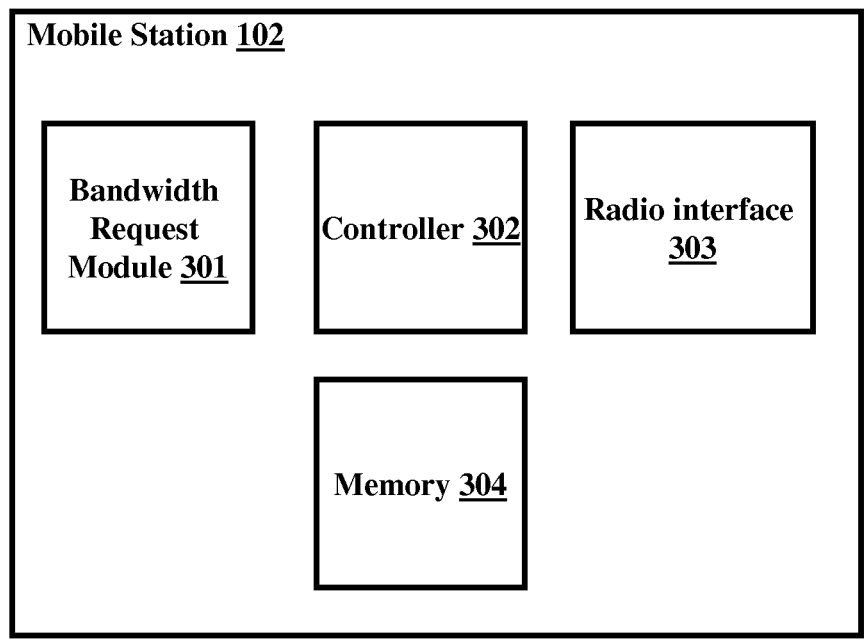
FIG. 3 depicts a mobile station, according to embodiments as disclosed herein.

FIG. 3 depicts a mobile station, according to embodiments as disclosed herein. The mobile station 102 as depicted comprises of a bandwidth request module 301, a controller 302, a radio interface 303 and a memory. The radio interface 303 comprises of suitable means for the mobile station 102 to communicate with the base station 101. The controller 302 controls the functioning of the modules present within the mobile station 102, including the bandwidth request module 301 and the radio interface 303.

The controller 302 receives the parameters sent by the base station 101 and stores the parameters in the memory 304. The parameters comprise of connection priority, initial back-off interval (I), maximum back-off interval (M), and back-off interval scaling factor(s). In another embodiment herein, the parameters comprise of the connection priority, a minimum time delay interval, a maximum time delay interval, a minimum scaling factor and a maximum scaling factor.

The bandwidth request module 301, on detecting that data needs to be send to the base station 101, sends a request for bandwidth to the base station 101. The bandwidth request module 301 may detect that data is to be sent to the base station 101 on receiving an indication from the controller 302. The bandwidth request module 301 sends the request to the base station 101 using the radio interface 303. If the bandwidth request module 301 does not receive any response from the base station 101 within a predefined interval, the bandwidth request module 301 assumes that the base station 101 did not receive the request. The predefined interval may be defined by the service provider, the manufacturer of the mobile station 102 or the user of the mobile station 102. The predefined interval may be defined in terms of a suitable unit of time e.g. milliseconds, seconds and so on. The predefined interval may also be defined in terms of slots or blocks of the communication scheme being currently used by the mobile station 102.

The bandwidth request module 301 informs the controller 302 of the failure in sending the bandwidth request to the base station 101. The controller 302 fetches the stored parameters from the memory 304 and calculates a random time interval, after which the controller 302 instructs the bandwidth request module 301 to attempt to send a bandwidth request to the base station 101.

In an embodiment herein, the controller 302 instructs the bandwidth request module 301 to wait for a timer value drawn uniformly at random from the interval (I, min[(s^(k-1))*I, M]) for the k$^{th}$ attempt. For example, for the first attempt (k=1), the mobile station 102 waits for the initial back-off interval, I, before retrying.

In an embodiment herein, the controller 302 instructs the bandwidth request module 301 to wait for a timer value drawn uniformly at random from the interval ($CW_{min, k}$, $CW_{max, k}$), $CW_{min, k}=CW_{min, k-1}*SF_{min}$, $CW_{max, k}=CW_{max, k-1}*SF_{max}$ for the k$^{th}$ attempt, where $CW_{min}$ is the minimum time delay interval, $CW_{max}$ is the maximum time delay interval, $SF_{min}$ is the minimum scaling factor and $SF_{max}$ is the maximum scaling factor.

In another embodiment herein, the bandwidth request module 301 may perform the actions, as performed by the controller 302.

Figure 4:
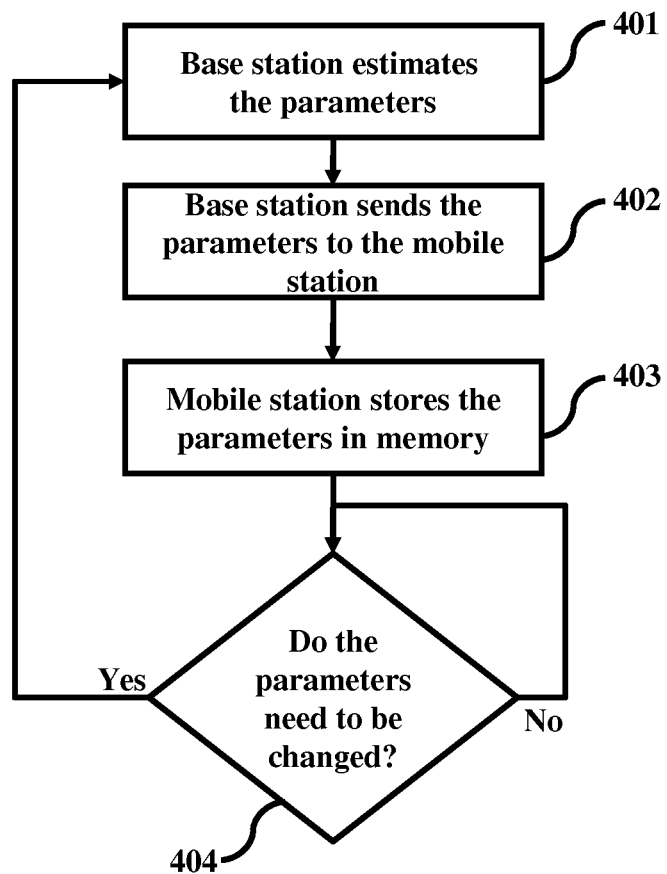
FIG. 4 is a flowchart depicting a process, according to embodiments disclosed herein.

FIG. 4 is a flowchart depicting a process, according to embodiments disclosed herein. The base station 101 defines (401) a set of parameters. In an embodiment herein, the parameters comprise of connection priority, initial back-off interval, maximum back-off interval, and back-off interval scaling factor. Connection priority is a unique identifier for the triplet of initial back-off interval, maximum back-off interval and back-off interval scaling factor. In another embodiment herein, the parameters comprise of the connection priority, a minimum time delay interval, a maximum time delay interval, a minimum scaling factor and a maximum scaling factor to the mobile station 101. The connection priority has a set of parameters comprising of the minimum time delay interval, the maximum time delay interval, the minimum scaling factor and the maximum scaling factor associated with it. The base station 101 sends (402) these parameters to a mobile station 102. The base station 101 may send the parameters to the base station 102 either on a common downlink broadcast channel or on a separate channel setup for the QoS negotiation. The mobile station 102 on receiving the parameters sent by the base station 101, stores (403) the parameters in the memory 304. The base station 101 checks (404) if the parameters associated with a mobile station 102 need to be changed. The parameters may need to be changed because the load on the network has changed. If the load on the network has reduced, the base station 101 may change the connection priority associated with the mobile station 102 to a higher connection priority. If the load on the network has increased, the base station 101 may change the connection priority associated with the mobile station 102 to a lower connection priority. The base station 102 may measure the load on the network by counting the number of bandwidth requests received by the base station 101. The parameters may need to be changed because the QoS level associated with the mobile station 102 may have been changed. Either base station or mobile station can trigger a change in QoS level. If the parameters need to be changed, then the base station 101 proceeds from step (401). The various actions in method 400 may be performed in the order presented, in a different order or simultaneously. Further, in some embodiments, some actions listed in FIG. 4 may be omitted.

Figure 5:
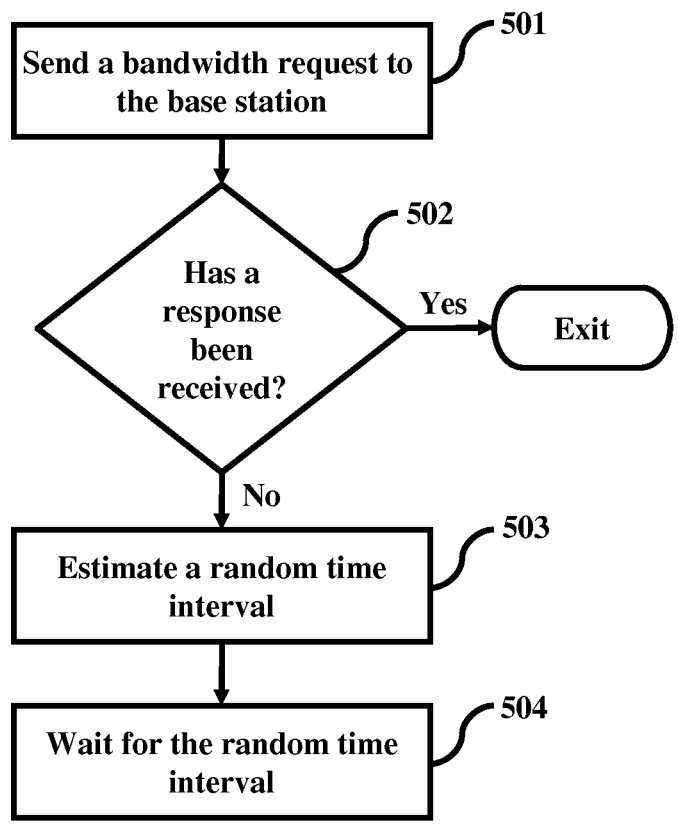
FIG. 5 is a flowchart depicting a process, according to embodiments disclosed herein.

FIG. 5 is a flowchart depicting a process, according to embodiments disclosed herein. The mobile station 102, on detecting that data needs to be send to the base station 101, sends (501) a request for bandwidth to the base station 101. The mobile station 102 checks (502) if a response has been received from the base station 101. If the mobile station 102 does not receive any response from the base station 101 within a predefined interval, the mobile station 102 assumes that the base station 101 did not receive the request. The mobile station 102, then calculates (503) a random time interval. In an embodiment herein, the random time interval is a timer value drawn uniformly at random from the interval (I, $\min[(s^\wedge(k-1))*I, M]$) for the $k^{th}$ attempt. In another embodiment herein, the random time interval is a timer value drawn uniformly at random from the interval ($CW_{min, k}$, $CW_{max, k}$), $CW_{min, k}=CW_{min, k-1}*SF_{min}$, $CW_{max, k}=CW_{max, k-1}*SF_{max}$ for the $k^{th}$ attempt. The mobile station 102 then waits (504) for the random time interval, before proceeding with step (501). The various actions in method 500 may be performed in the order presented, in a different order or simultaneously. Further, in some embodiments, some actions listed in FIG. 5 may be omitted.

Embodiments herein may be implemented in the medium access (MAC) layer between the mobile station 102 and base station 101 in existing mobile communication systems and for upcoming mobile communication systems like 4G. Embodiments herein may be used by mobile applications that are required to send data out from the mobile station 102 to an arbitrary destination through an uplink connection with the base station 101.

Embodiments herein define parameters that the base station 101 must communicate to the mobile stations 102 to enable the mobile applications to improve average delay in performing successful bandwidth request; and also to allow mobile applications with higher QoS priority to be serviced, on the average, before mobile applications with lower QoS priority, where the mobile applications are resident on the mobile stations 102.

Embodiments herein also define algorithms that the mobile station 102 must execute with the parameters that the base station 101 uses to communicate to the mobile station 102 in order to improve average delay in performing successful bandwidth request; and also to allow mobile applications with higher QoS priority to be serviced, on the average, before mobile applications with lower QoS priority.

Embodiments herein define the usage of the window sizes and scaling factors in the connection priority. If a collision occurs, then each mobile station involved in the contention chooses a back-off timer depending on the window sizes and scaling factors associated with the connection priority.

The base station 101 assigns higher values of contention windows and scaling factors to connections with lower QoS requirements, hereby differentiating between mobile stations with different QoS requirements. The base station 101 varies the connection parameters depending on system load. As system load increases, the base station 101 increases the contention windows and scaling factors. The base station 102 may measure the load on the network by counting the number of bandwidth requests received by the base station 101. The base station 101 reduces the contention windows and scaling factors in response to decrease in load.

Embodiments herein may be adapted to implement the Binary Exponential Back-off. To achieve Binary Exponential Back-off, the scaling factors can be chosen as $SF_{min}=1$ and $SF_{max}=2$.

Embodiments herein permit the connection priority parameters to be communicated to the mobile stations either at periodic intervals or during a special connection setup phase when the QoS requirements of the mobile station are negotiated. In the former case, the mobile station can map the connection priority to use for a bandwidth request as a function of the service class and QoS requirement.

Embodiments herein define strategies to be followed at the base station and mobile stations to improve average delay in performing successful bandwidth request; and also to allow mobile applications with higher QoS priority to be serviced, on the average, before mobile applications with lower QoS priority.

Embodiment disclosed herein do not require the base station 101 or the mobile station 102 to sense the channel state in order to determine simultaneous bandwidth requests being sent from the mobile station 102 to the base station 101.

Embodiments disclosed herein also do not require the mobile station 102 or the base station 101 to be count the collisions occurring on the channel.

The embodiments disclosed herein can be implemented through at least one software program running on at least one hardware device and performing network management functions to control the network elements. The network elements shown in FIGS. 1, 2 and 3 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method of a mobile station sending a bandwidth request to a base station after a time delay, said method comprising:
    calculating said time delay by said mobile station as a random number based on connection priority parameters of said mobile station on not receiving a response from said base station within a predefined interval for a bandwidth request sent to said base station,
    wherein said connection priority parameters depend on Quality of Service (QoS) class assigned to said mobile station, and
    wherein said connection priority parameters comprise an initial back-off interval, a maximum back-off interval, a back-off interval scaling factor, a minimum time delay interval, a maximum time delay interval, a minimum scaling factor, and maximum scaling factor.

2. The method as claimed in claim 1, wherein said method further comprises:
    sending said connection priority parameters by said base station to said mobile station based on (QoS) class for said mobile station;
    checking by said base station when connection priority parameters associated with said mobile station need to be changed based on network load; and storing said connection priority parameters by said mobile station on receiving said connection priority parameters from said base station.

3. The method as claimed in claim 1, wherein said random number comprises a timer value drawn uniformly at random from an interval, wherein said interval is defined by (initial back-off interval, min [(back-off interval scaling factor^(k−1))*initial back-off interval, maximum back-off interval]), where k is the number of the current retry by said mobile station to send said bandwidth request.

4. The method as claimed in claim 1 wherein said random number for said time delay is selected uniformly at random from said interval defined by $(CW_{min, k}, CW_{max, k})$, $CW_{min, k} = CW_{min, k-1}*SF_{min}$, $CW_{max, k} = CW_{max, k-1}*SF_{max}$, where k is the number of the current retry by said base station to send said bandwidth request and $CW_{min, k-1}$ is minimum time delay interval for $(k-1)^{th}$ attempt, $CW_{max, k-1}$ is maximum time delay interval for $(k-1)^{th}$ attempt, $SF_{min}$ is said minimum scaling factor and $SF_{max}$ is said maximum scaling factor.

5. A base station comprising:
a scheduler;
a controller; and
a radio interface,
wherein said base station is configured to define connection priority parameters to be used by mobile stations to make bandwidth requests,
wherein said connection priority parameters depend on Quality of Service (QoS) class assigned to said mobile stations,
wherein said connection priority parameters comprises an initial back off interval, a minimum time delay interval, a maximum time delay interval, a minimum scaling factor, a maximum scaling factor, and a back-off interval scaling factor, and
wherein said base station is configured to send said parameters to said mobile stations.

6. The base station as claimed in claim 5, wherein said base station is configured to check when said parameters sent to said mobile station need to be changed based on the network load for each QoS class.

7. The base station as claimed in claim 5, wherein said base station is configured to change said connection priority parameters associated with said mobile station to higher values when said load on said network has increased and to lower values when said load on said network has reduced.

8. The base station as claimed in claim 5, wherein said base station is configured to measure said load on said network by counting number of said bandwidth requests received for each QoS class.

9. A mobile station comprising:
a bandwidth request module, a controller, a radio interface, and a memory, wherein said mobile station is configured to:
receive connection priority parameters sent by a base station, wherein said connection priority parameters depend on Quality of Service (QoS) class assigned to said mobile station, wherein said mobile station comprises an initial back off interval, a maximum back off interval, a back off interval scaling factor, a minimum time delay interval, a maximum time delay interval, a minimum scaling factor, and a maximum scaling factor;
store said parameters in said memory;
send a request for bandwidth to said base station;
fetch stored parameters from said memory; and
calculate a time delay as a random number based on said connection priority parameters on not receiving a response from said base station within a predefined interval for a bandwidth request sent to said base station.

10. The mobile station, as claimed in claim 9, wherein said random number comprises a timer value drawn uniformly at random from a interval and said interval is defined by (initial back-off interval, min [(back-off interval scaling factor^(k−1))*initial back-off interval, maximum back-off interval]), where k is the number of the current retry by said mobile station to send said bandwidth request.

11. The mobile station as claimed in claim 9, wherein said random number for said time delay is selected uniformly at random from an interval defined by $(CW_{min, k}, CW_{max, k})$, $CW_{min, k} = CW_{min, k-1}*SF_{min}$, $CW_{max, k} = CW_{max, k-1}*SF_{max}$, where k is the number of the current retry by said base station to send said bandwidth request and $CW_{min, k-1}$ is minimum time delay interval for $(k-1)^{th}$ attempt, $CW_{max, k-1}$ is maximum time delay interval for $(k-1)^{th}$ attempt, $SF_{min}$ is said minimum scaling factor and $SF_{max}$ is said maximum scaling factor.

* * * * *